United States Patent [19]

Schmitz

[11] Patent Number: 5,437,419
[45] Date of Patent: Aug. 1, 1995

[54] ROTORCRAFT BLADE-VORTEX INTERACTION CONTROLLER

[75] Inventor: Frederic H. Schmitz, Palo Alto, Calif.

[73] Assignee: The United States of America as represented by the United States National Aeronautics and Space Administration, Washington, D.C.

[21] Appl. No.: 972,790

[22] Filed: Nov. 6, 1992

[51] Int. Cl.[6] ............................................. B64C 27/00
[52] U.S. Cl. ................................ 244/17.11; 244/1 N; 244/199
[58] Field of Search ................. 244/1 N, 198, 199, 87, 244/90 B, 17.11, 213, 110 D, 113, 110 R

[56] References Cited

U.S. PATENT DOCUMENTS

| | | | |
|---|---|---|---|
| 1,789,254 | 1/1931 | Perrin | 244/6 |
| 1,801,184 | 4/1931 | Yost | 244/17.11 |
| 2,189,553 | 2/1940 | Schut | 244/113 |
| 2,461,967 | 2/1949 | Devlin et al. | 244/113 |
| 2,698,149 | 12/1954 | Greenwood et al. | 244/113 |
| 2,959,373 | 11/1960 | Zuck | 244/7 R |
| 2,993,413 | 7/1961 | McCormack | 244/113 |
| 3,081,052 | 3/1963 | Michel | 244/17.19 |
| 3,431,119 | 3/1969 | Miller | 244/17.11 |
| 3,464,651 | 9/1969 | Lightfoot | 244/17.13 |
| 3,483,696 | 12/1969 | Gilbert et al. | 244/17.11 |
| 3,532,301 | 10/1970 | Swatton | 244/12.4 |
| 3,554,467 | 1/1971 | Yowell | 244/17.19 |
| 3,776,363 | 12/1973 | Kuethe | 244/1 N |
| 3,779,338 | 12/1973 | Hayden et al. | 244/1 N |
| 3,848,831 | 11/1974 | Geary | 244/110 D |
| 4,036,452 | 7/1907 | Schairer | 244/1 N |
| 4,245,802 | 1/1981 | Jong, Jr. | 244/17.19 |
| 4,447,022 | 5/1984 | Lion | 244/13 |
| 4,462,559 | 7/1984 | Garza | 244/87 |
| 4,730,795 | 3/1988 | David | 244/7 R |
| 4,739,957 | 4/1988 | Vess et al. | 244/199 |
| 4,795,308 | 1/1989 | Fischer et al. | 244/1 N |
| 5,050,822 | 9/1991 | Whitehouse et al. | 244/215 |
| 5,209,430 | 5/1993 | Wilson et al. | 244/17.11 |

FOREIGN PATENT DOCUMENTS

| | | |
|---|---|---|
| 2133378 | 1/1973 | Germany . |
| 2236415 | 3/1973 | Germany . |
| 2117823 | 10/1975 | Germany . |
| 9103623 | 3/1991 | WIPO . |

Primary Examiner—Margaret A. Focarino
Assistant Examiner—Christopher P. Ellis
Attorney, Agent, or Firm—Kenneth L. Warsh; Guy M. Miller; John G. Mannix

[57] ABSTRACT

Blade-vortex interaction noises, sometimes referred to as "blade slap", are avoided by increasing the absolute value of inflow to the rotor system of a rotorcraft. This is accomplished by creating a drag force which causes the angle of the tip-path plane of the rotor system to become more negative or more positive.

6 Claims, 16 Drawing Sheets (a) CLIMBING (b) DESCENDING

ROTORCRAFT BLADE-VORTEX INTERACTION CONTROLLER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates generally to the field of rotorcraft aerodynamics and, more specifically, to devices for and methods of reducing noise through control of rotorcraft blade-vortex interaction.

TECHNICAL FIELD OF THE INVENTION

Rotor noise associated with rotorcraft, such as helicopters, poses an obstacle to both commercial and military use of the aircraft. While there are many types of noises associated with rotorcraft, blade vortex interaction (BVI) noise is one of the most severe. Blade vortex interaction (BVI) is defined in the general sense to be the interaction of the rotor blades with any part of the wake shed from the rotor blades. This general definition includes all portions of each rotor blade that interact with trailing vorticity due strong changes in circulation (vorticity) shed near each blade tip, shed vorticity along each blade span due to radial circulation distribution, and vorticity shed into the wake by changing azimuthal circulation. The most intense interaction occurs when the rotor blades interact with the rotor blade tip vortices—hence the name blade vortex interaction (BVI). BVI noise is due to impulsive aerodynamic events that occur at deterministic locations around the rotor azimuth. These impulsive events are most likely to occur when the rotor is in non-axial translation and the tip vortices from preceding blades interact with the following blades. Generally, a sudden impulse is produced near the leading edge of the rotor and generates an impulsive noise that radiates away from the rotor. This impulsive event contains many harmonics of radiated noise and is widely considered to be a major source of acoustic annoyance associated with rotorcraft.

It is known that most of the radiated noise is generated near the rotor tip. Moreover, it is expected that BVI noise will occur when the rotor blade passes close to the trailing-tip vortices. As shown in FIG. 1, where "V" is the velocity of the free-stream air relative to the rotorcraft (which is also equal to the velocity of the rotorcraft in fixed inertial space), for each of the seven possible BVI's, the strength of each interaction is determined by the local strength of the tip vortex, the core size of the tip vortex, the local interaction angle of the blade and the vortex line, and the vertical separation between the vortex and the blade. Generally, the induced velocity of the rotor disk tends to make the tip vortices pass under the rotor disk in level, steady-state flight conditions with an advance ratio $\mu$ (the ratio of the free-stream air to the rotor tip speed) of 0.145 as shown in FIG. 2(a). However, if the rotor operates in steady descending flight, then the positive inflow (upflow) tends to force the epicycloid-type pattern into the rotor disk plane and causes strong blade-vortex interactions, as shown in FIG. 2(b).

As the rotor blade passes in close proximity to and/or directly intersects the shed tip vortices, high amplitude, short duration local aerodynamic forces are created which radiate large amounts of impulsive noise. This noise, sometimes referred to as "blade slap" predominates in landing/approach where rotorcraft often fly in such a way as to cause the rotor blades to interact with vortices shed from previous blades.

Efforts have been made in the past to reduce or eliminate all forms of rotorcraft impulsive noise. In high speed forward flight, another type of impulsive noise is often generated by helicopters often labeled "high speed impulsive" (HSI) noise. It occurs on the advancing blade tip at high advancing tip Mach numbers and is caused by local aerodynamic perturbations that are amplified to radiate impulsive acoustic waves. In the extreme cases, shock waves that occur near the tip of the advancing rotor blades "delocalize" and radiate large amounts of high speed impulsive (HSI) noise. Blade thickness near the rotor blade tip and the helicopters advancing tip Mach number are important parameters of HSI noise. To control noise associated with this phenomenon, researchers have reduced the operational tip speeds of the helicopter (to reduce the resultant advancing tip Mach numbers), selected suitable blade airfoil shapes (to achieve a low thickness ratio, favorable pressure distribution, etc.), and swept the tip of the rotor blades.

In general, blade sweeping and thinning help reduce the local compressibility field of the rotor thus avoiding the high speed impulsive noise phenomenon. Rotor tip speeds of the more modern helicopters have also been reduced, thus reducing the blade's advancing tip Mach number. However, this gain is often balanced by higher forward flight speeds. The net result is a helicopter that cruises at higher speeds but with lessened compressibility effects such that shock waves on the rotor do not radiate to the acoustic far field. These changes have been instituted by most major helicopter manufacturers to minimize the high speed impulsive (HSI) noise problem.

Efforts to reduce blade vortex interaction (BVI) impulsive noise have not been as successful. The blades must create lift and therefore will shed tip vortices in all regimes of flight. For the low and moderate speed regimes of flight, blade vortex interaction (BVI) has been addressed by (1) modifying the structure of the vortex itself, and (2) enlarging the dimensional separation between the vortices and the blade. Vortex modification can be achieved by special blade tip designs, such as the tapered tip, the raked tip, or the ogee tip, or by adding spoilers to the end of the blade. However, there is usually a significant power penalty associated with these tip modifications, and their effectiveness at eradicating blade slap has not always been confirmed.

Increasing the number of blades may lead to a reduction in blade-vortex interaction (BVI) noise by reducing the spanwise blade loading and thus reducing the strength of the tip vortices. However, the increased blade number often causes smaller distances between vortices and blades causing more frequent interactions. Other ways of achieving dimensional separation between the tip vortices and the oncoming blades include the use of different blade diameters within the same rotor, uneven angles between the blades, and unequal elevations of the tip path planes of two sets of blades within the same rotor. To date, all of these methods of reducing BVI noise have met with mixed success.

Because BVI impulsive noise is likely to occur in descent and/or deceleration during landing/approach, it has a strong influence on whether or not the rotorcraft will be allowed to operate near urban population centers. Adding blades at a constant gross weight to reduce the strength of each tip vortex has lowered the intensity of BVI noise of the modern helicopter. Unfortunately, the frequency of the noise has increased, thus making the emitted higher frequency sound more annoying than the same pulse level at lower frequency. The net result is a modest reduction in BVI noise, but not enough to reduce the problem to acceptable levels.

In addition to structural modifications to the blades, it was discovered that rotorcraft could be flown so as to minimize BVI noise that is radiated in certain directions under specified flight conditions. By flying chosen rates of descents and airspeeds much of the BVI noise heard in the cockpit and subsequently radiated to the surrounding community could be controlled. See "In-Flight Far-Field Measurement of helicopter Impulsive Noise" by F. H. Schmitz and D. A. Boxwell, *J. American Helicopter Society*, Vol. 21, No. 4, October 1976, pp. 2–16 and Cox, C. R., "How to Operate the Medium Helicopter More Quietly", by Cox, C. R., *U.S. Army Aviation Digest*, Vol. 19, 1973, pp. 9, 25, 33–38.

Those conditions where BVI noise radiation was most intense were avoided. This usually meant flying at higher descent rates and/or at higher forward velocities. Under ideal conditions, substantial reductions in BVI noise were possible. However, the flying techniques which resulted in noise abatement were not as conservative as normal approaches to landing, and thus they were not generally adopted by the United States Army.

SUMMARY OF THE INVENTION

An object of the present invention is to eliminate or reduce rotorcraft BVI noise.

Another object of the present invention is to provide a device for altering the inflow of air into the rotor of a rotorcraft, such as a helicopter, in order to avoid interference between the tip vortices and following blades.

Another object of the present invention is to provide a method of reducing BVI noise which does not require rapid descent rates or fast forward speeds on approach to landing.

These and other objects of the invention are met by providing an apparatus for reducing BVI noise of a rotorcraft which includes means for altering the inflow to the rotor system such that the separation between the rotor's shed wake and the following rotor blades is made as large as possible. This separation reduces the disturbances to following rotor blades causing each following blade to radiate less external noise.

Other objects, advantages and salient features of the invention will become apparent from the following detailed description, which, taken in conjunction with the annexed drawings, discloses preferred embodiments of the invention.

DETAILED DESCRIPTION OF THE INVENTION

Figure 1:
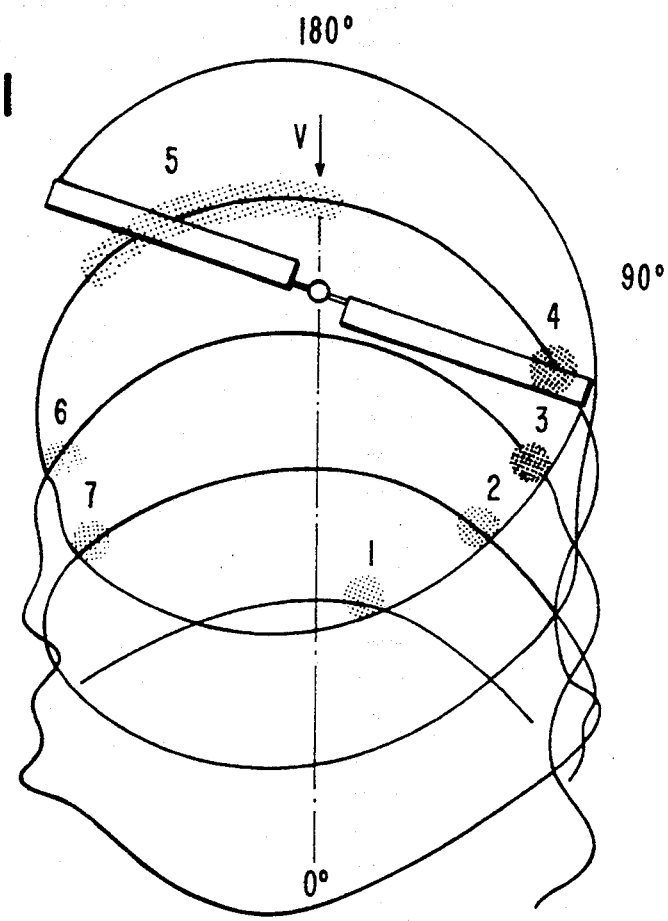
FIG. 1 is a schematic view showing blade-vortex interactions during partial-power descent.
Figure 2A:
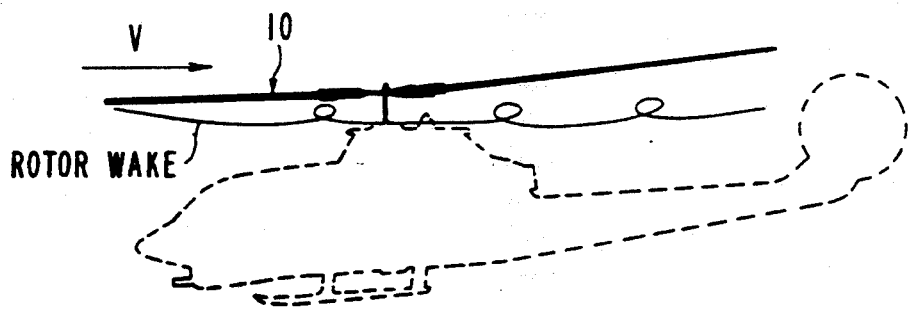
FIG. 2(a) is a schematic view showing relative position of the rotor disk and tip vortices in level flight.

Referring to FIGS. 2(a), the rotor's disk 10 is tilted slightly forward from the horizontal to allow a component of the thrust vector to balance the drag of the vehicle. The wake of the rotor disk 10 passes beneath the rotor disk as illustrated and does not strongly interact with the rotor blades. The component of forward velocity normal to the rotor disk now adds to the induced velocity of the rotor causing the shed wake to move away from the rotor plane. This illustration shows normal level steady-state flight where external noise due to wake interaction is not normally a severe problem.

Figure 2B:
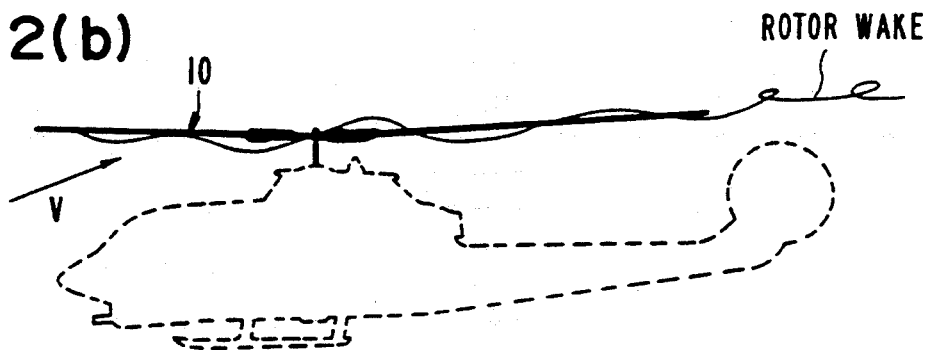
FIG. 2(b) is a schematic view showing relative position of the rotor disk and tip vortices in descending flight.

In descending steady-state flight the situation changes to what is illustrated in FIG. 2(b). The velocity vector now has a component normal to the plane of the rotor tips that opposes the induced velocity of the rotor. The net result is that the rotor's shed wake is held near to the plane of the rotor tips. Each rotor blade then aerodynamically interacts with the vortex structure of the wake causing unsteady blade loads which radiate large amounts of external noise.

Figure 3A:
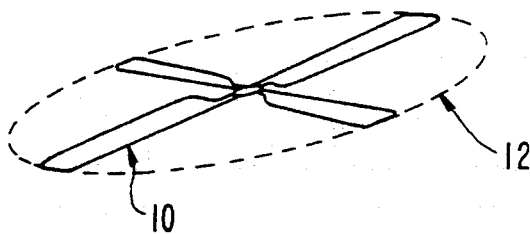
FIG. 3(a) is a schematic, perspective view of a rotor disk showing the rotor tip path plane.
Figure 3B:
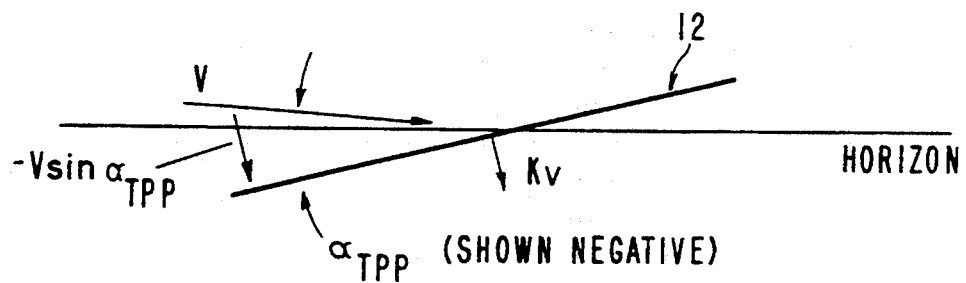
FIG. 3(b) is a schematic, side elevational view of the rotor disk of FIG. 3(a)

FIG. 3(a) is a perspective view of the rotor disk 10 of FIGS. 2(a) and 2(b), with blade coning and lateral flapping omitted for simplicity. A side elevation of the rotor tip-path plane 12 is illustrated in FIG. 3(b). The rotor disk's tip-path plane 12 is tilted forward as in the forward flight case. The inflow to the rotor disk 10 is positive and is given by the following equation:

$$\text{rotor inflow} = \lambda_{TPP} = V \sin\alpha_{TPP} - kv \quad (1\text{-a})$$

{average flow passing normal to the rotor's tip-path plane} where
V = velocity of the rotorcraft
$\alpha_{TPP}$ = tip-path plane angle of the rotor
v = average induced velocity of the rotor Equation (1-a) is often written in nondimensional form by dividing the rotor's tip speed, $\Omega R$. It thus becomes: Nondimensional rotor inflow $$= \lambda_{TPP} = \frac{\lambda_{TPP}}{\Omega R} = \frac{V \sin\alpha_{TPP} - kv}{\Omega R} \quad (1\text{-b})$$

For a given velocity (V), tip speed ($\Omega R$) and induced velocity (v), the tip-path plane angle ($\alpha_{TPP}$) governs the inflow through the rotor disk. In level non-accelerating flight at cruise speeds or above, the inflow (flow normal to the rotor's tip-path plane) passes through from above the rotor. Employing conventional helicopter notation, the angle between the velocity vector and the rotor's tip path plane ($\alpha_{TPP}$), and the rotor inflow normal tip-path plane ($\lambda_{TPP}$) are both defined to be negative under these level non-accelerating flight conditions.

To minimize radiated noise, the inflow ($\lambda_{TPP}$) can be positive or negative. It is only necessary that the inflow be large enough to cause the wake shed from the rotor blades to be swept away from the following rotor blades. Large negative inflow causes the vortex system to be pushed under the rotor's tip-path plane. This normally occurs in high speed level flight and during climb. Large positive inflow causes the vortex system to pass above the rotor's tip-path-plane. This latter situation is often encountered in autogyro flight or during autorotation on conventional helicopters. Near zero inflow implies that the vortex system shed from the rotor lies directly in the rotor's tip-path plane.

Some of the parameters that control the rotor's inflow are set by the rotorcraft's design. The average induced velocity (v) is a function of the vehicle's disk loading (T/A=thrust/rotor disk area), forward speed V, operating density ($\rho$) and the rotor's tip-path plane angle ($\alpha_{TPP}$). Changing the rotorcraft's disk loading can alter the average induced velocity substantially making the "kv" term in the equation large negatively. In this simple model of average inflow through the rotor disk, the constant "k" is introduced to represent the effect of the local induced velocity field of the rotor. The wake vortex system does not convect in a uniform manner across the rotor disk. In those azimuthal regions where BVI occurs, k is normally chosen to be $\frac{1}{2}$. In the following discussion, k is assumed to be $\frac{1}{2}$, although this assumption is not critical to the present invention.

Controlling $\alpha_{TPP}$ is an effective way of maximizing the absolute value of the inflow. Inflow is determined by simply summing the existing forces on the helicopter.

In a wind axis system for steady level flight, $T\sin\alpha_{TPP} = -D_{eff}$, $T\cos\alpha_{TPP} = W$ = weight of rotorcraft; then assuming $\alpha_{TPP}$ is small, $T \approx W$. Hence, $$\alpha_{TPP} \approx -D_{eff}/W \quad (2)$$

Figure 4:
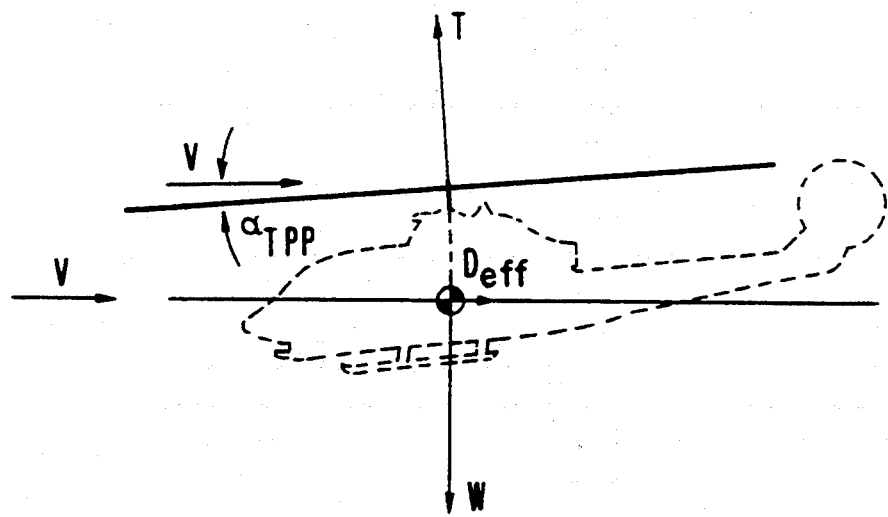
FIG. 4 is a schematic side elevational view showing helicopter balance of forces in steady level flight.

As shown in FIG. 4, the tip-path plane angle is negative and is governed by the effective drag, $D_{eff}$, of the helicopter ($D_{eff} = \frac{1}{2}\rho V^2 f_e$, where $f_e$ is the effective wetted drag coefficient of the helicopter.)

Figure 5:
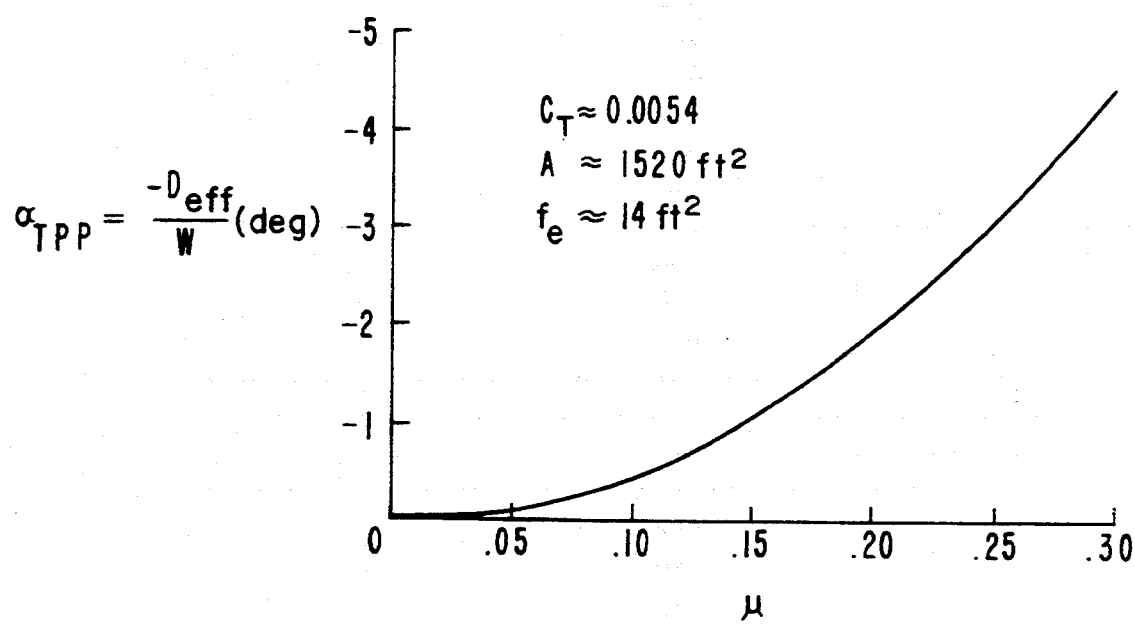
FIG. 5 is a graph showing tip-path plane angle versus advance ratio.

According to equation (1-a), the inflow is also negative, i.e., the flow is passing through the rotor from above. A plot of $\alpha_{TPP}$ for a typical helicopter (in this case a AH-1G Heuy Cobra) is shown in FIG. 5.

It should be noted that only small values of the tip-path plane angle are required to balance the forces in steady flight.

Climbing or descending flight also controls the rotorcraft's tip-path plane angle. The following equation is shown in FIGS. 6(a) and 6(b), showing tip-path plane angle for steady climbing flight and descending flight, respectively:

$$\alpha_{TPP} \approx \frac{-D_{eff}}{W} - \gamma \quad (3)$$

Figure 6A:
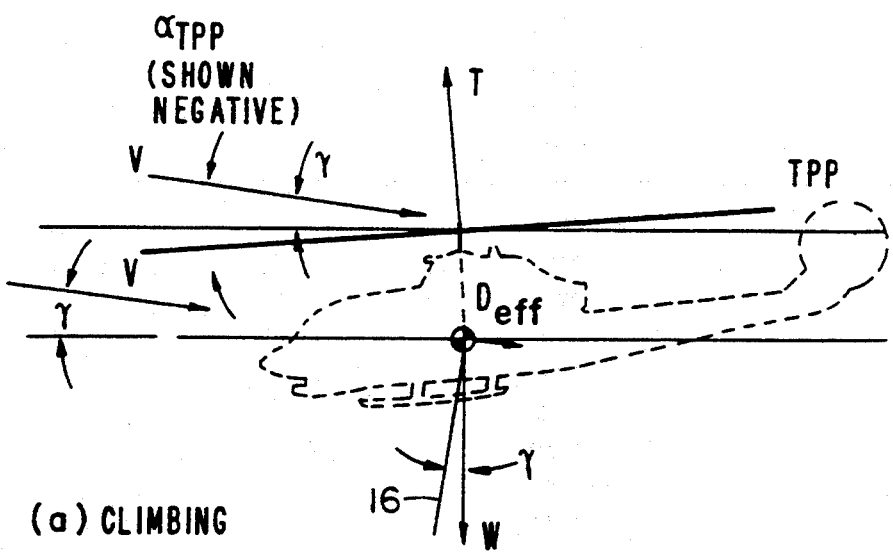
FIGS. 6(a) and 6(b) are schematic side elevational views of a helicopter tip-path plane for steady climbing and descending flight, respectively.
Figure 6B:
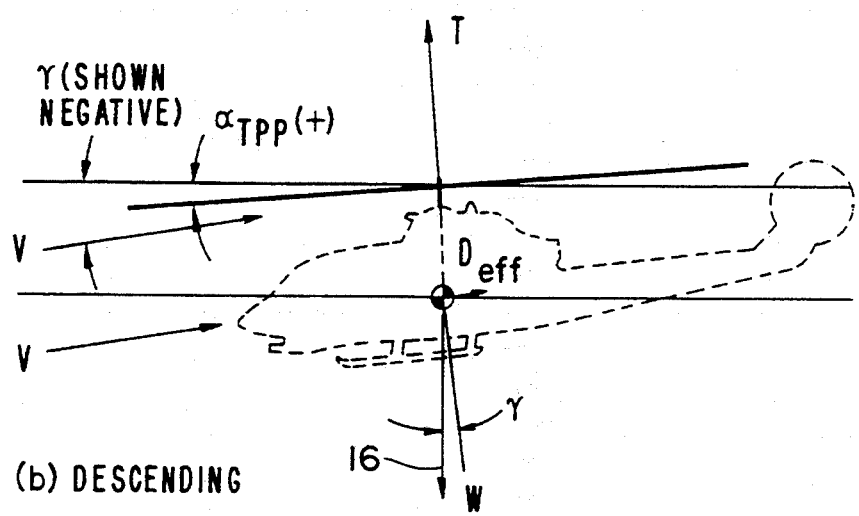
Figure 7:
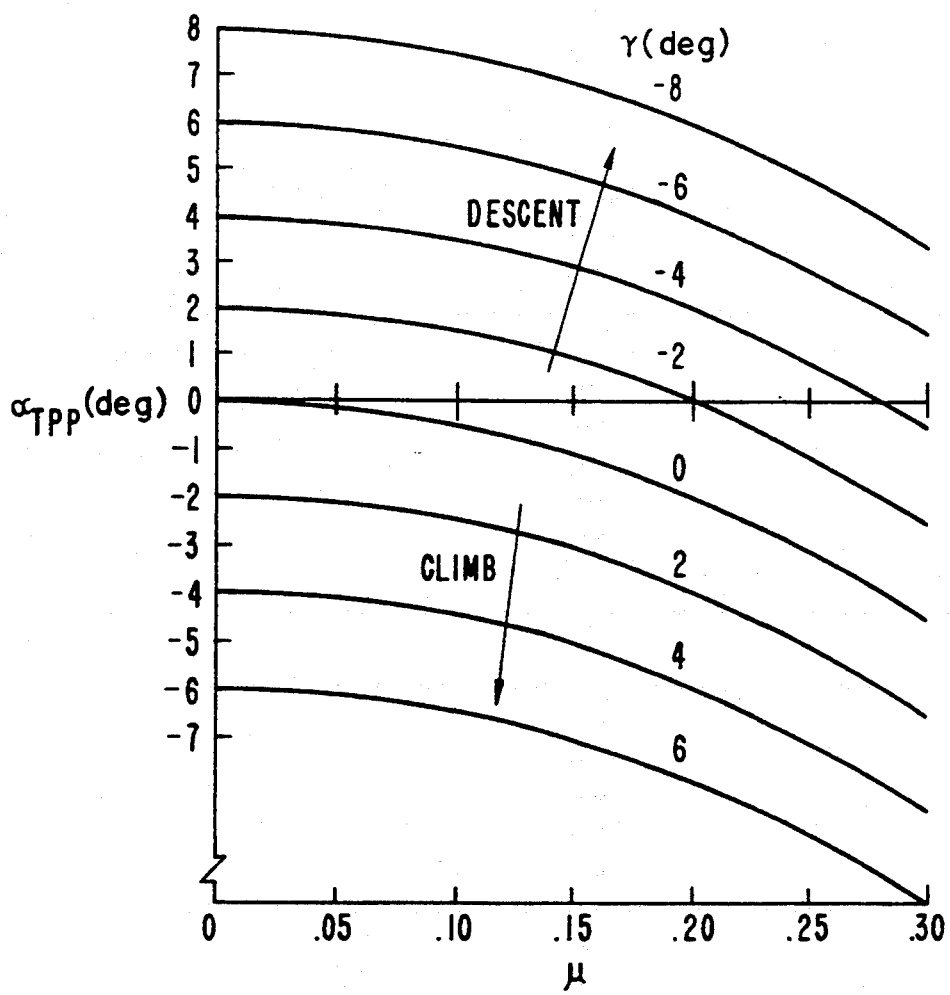
FIG. 7 is a graph showing the effect of climb angle on the tip-path plane angle.

(In FIGS. 6(a) and 6(b), line 16 is perpendicular to the velocity vector V.) Climbing flight makes the tip-path plane angle more negative and thus increases the inflow from above the rotor. Descending flight does the opposite, tending to decrease or even reverse the inflow from above the rotor. These trends of tip-path plane angle for various climbangles are shown in FIG. 7 for the example helicopter.

The second term that directly influences the inflow passing through the rotor disc in equation (1) is "kv". The "v" represents the average induced velocity of the rotor (which has been assumed to be uniform in this example) and is generally governed by the momentum theory expression:

$$v^4 - 2Vv^3\sin\alpha_{TPP} + V^2v^2 + \left(\frac{T}{2\rho A}\right)^2 = 0 \quad (4)$$

Figure 8:
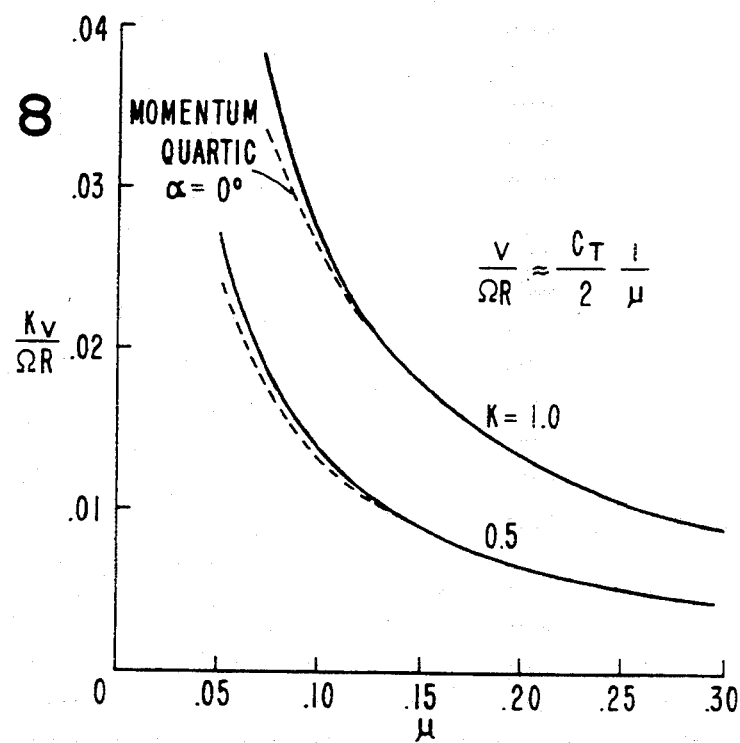
FIG. 8 is a graph showing $Kv/\Omega R$ versus advance ratio.

As previously noted, the constant "k" is included to account for the local induced velocity of the rotor. It is chosen to be for the advancing side BVI arguments presented here. A plot of the solution of equation (4) for $\alpha_{TPP} \approx 0$ degrees for the present example is shown in FIG. 8 by the dotted lines for k=1.0 and 0.5., respectively. Because the landing/approach profiles normally occur at advance ratios greater than 0.1, equation (4) can be simplified to the following:

$$\frac{Kv}{\Omega R} \approx K\frac{C_T}{2}\frac{1}{\mu} \quad (5)$$

This equation is also shown in FIG. 8 by the solid lines for k=1.0 and 0.5. It is evident that the induced velocity drops off steeply with forward velocity, and becomes very small at high forward velocities.

Using equations (3) and (5), the net nondimensional inflow equation (1-b) can be rewritten as follows:

$$\lambda \approx -\mu \frac{D}{W} - K \frac{C_T}{2} \frac{1}{\mu} - \mu\gamma \qquad (6)$$

Figure 9:
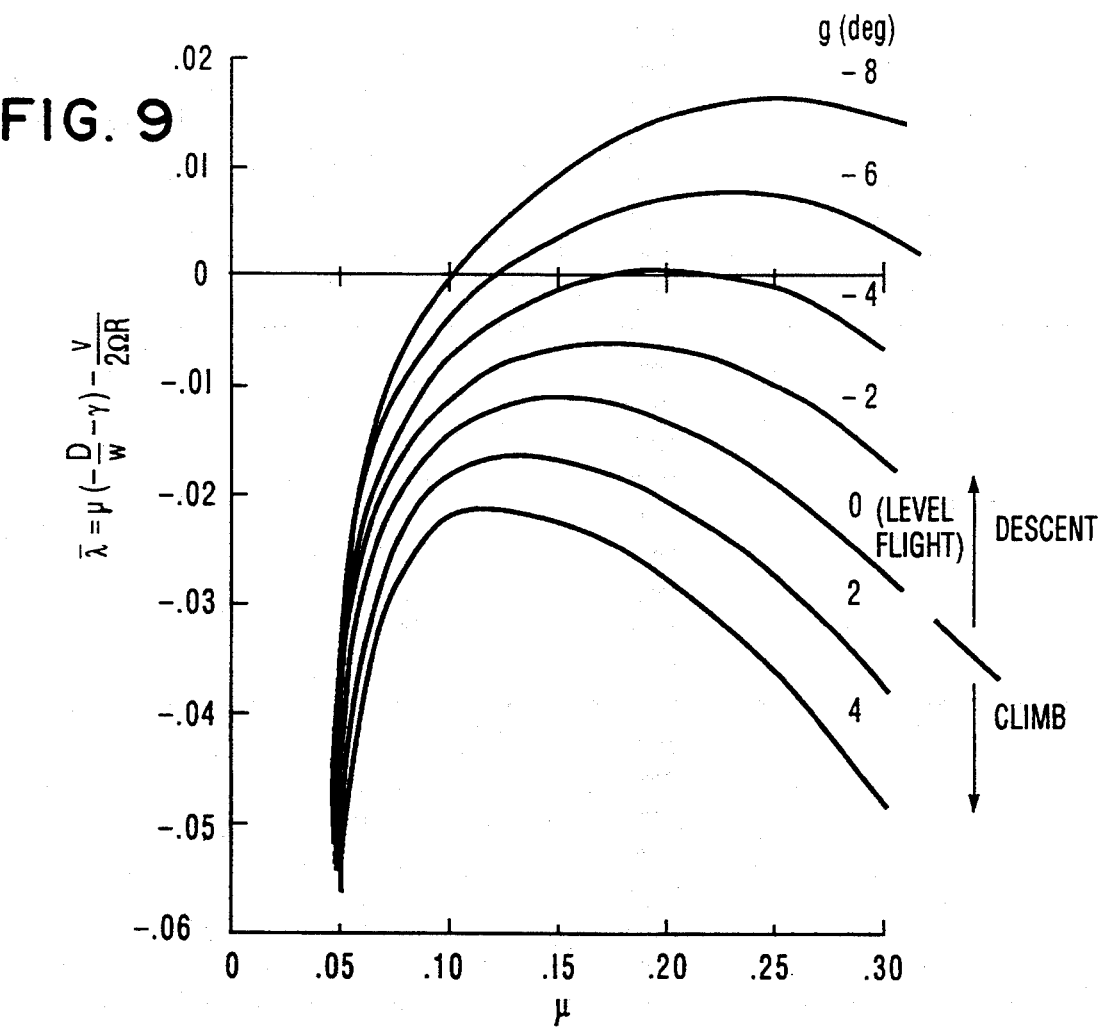
FIG. 9 is a graph showing inflow versus advance ratio for several values of $\gamma$.

The effects of the tip-path-plane tilt ($\alpha_{TPP}$) and induced velocity changes are implicitly accounted for. The new variables are climb angle ($\gamma$) and inflow ($\lambda$). The gross weight, density, tip-speed, and effective drag of the helicopter are normally known. The total nondimensionalized inflow for the chosen helicopter (equation 6) is given in FIG. 9 for k=0.5 and for several values of climb/descent angle. (This figure was obtained by combining FIGS. 7 and 8). The resulting characteristic plot shows that the inflow reaches a maximum value at some advance ratio for every value of climb or descent angle. Notice that the inflow is nearly zero at advance ratios between 0.15 and 0.25 when the helicopter is descending at an angle of about $-4°$. These are the conditions when BVI noise is the most intense for this helicopter. At these advance ratios, changing the descent angle from $\gamma=-4°$ either increases or decreases the inflow from its null value. Either change helps reduce the intensity of the BVI noise radiation. Notice too that at larger or smaller values of advance ratio, steeper descent angles are required, if zero inflow to the rotor is to be maintained.

The term $\mu\gamma$ can be rewritten as $$\mu\gamma = \frac{V\gamma}{\Omega R} = \frac{\text{Rate of climb (+) or descent (-)}}{\Omega R}$$

Figure 10:
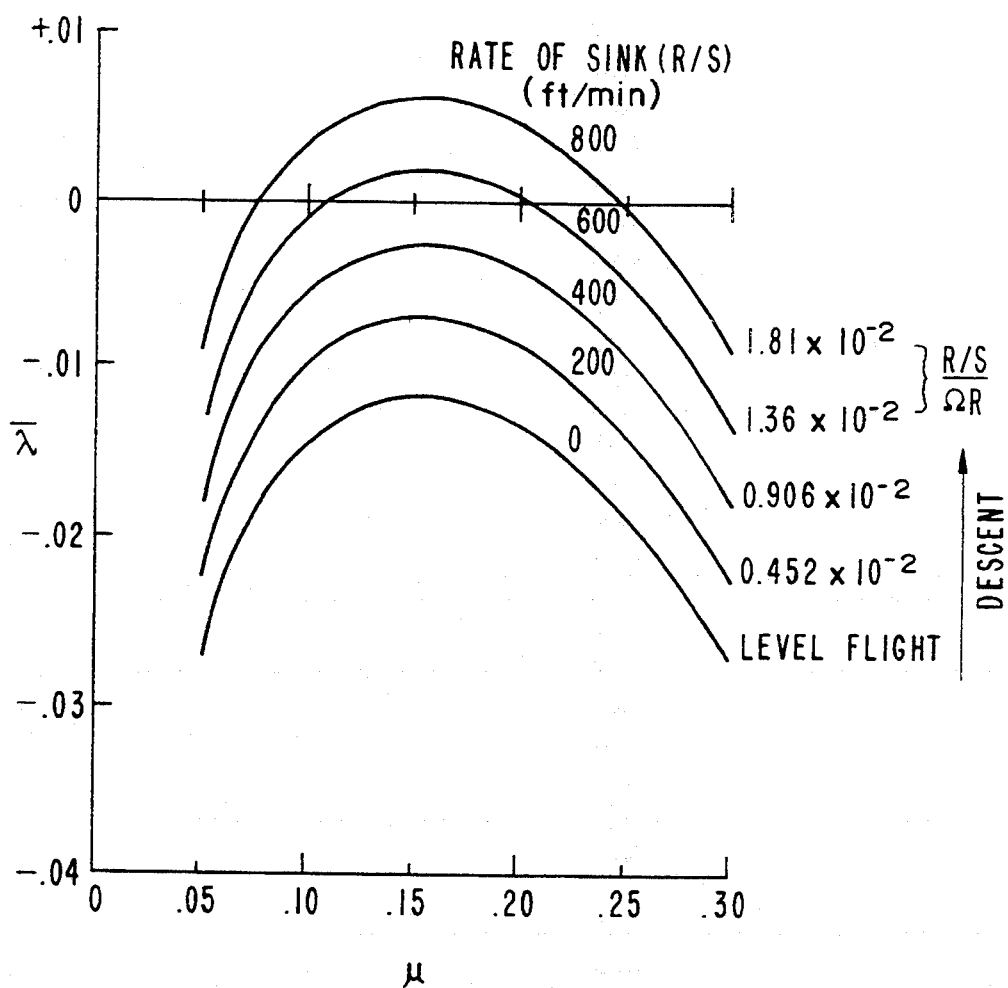
FIG. 10 is a graph showing inflow versus advance ratio for several values of rate of sink.

If rate of climb or descent is chosen as the independent parameter, equation (6) can be replotted as shown in FIG. 10. This plot is more useful to pilots who normally fly indicated airspeed in nautical miles per hour (knots) and rate of climb and/or sink in feet per minute (ft/min). Similar to FIG. 9, it shows that for zero rate of climb/descent, the inflow through the rotor system is normally negative. However, for the AH-1 helicopter at a rate of descent of about 500 ft/min at airspeeds of between 40 ($\mu \approx 0.1$) and 80 ($\mu \approx 0.2$) knots, near zero inflow through the rotor occurs. This steady-state performance condition is known to generate large amounts of impulsive noise radiation for the AH-1 helicopter.

Figure 11:
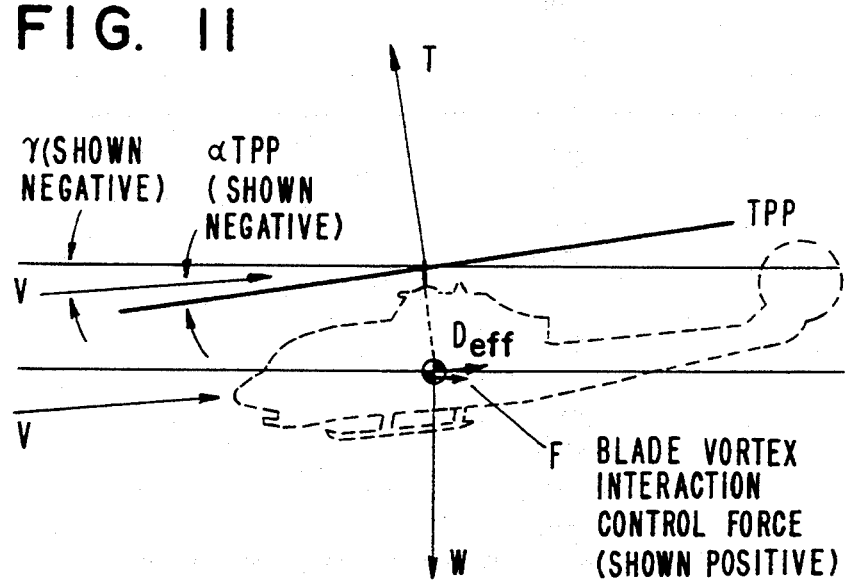
FIG. 11 is a schematic side elevational view showing tip-path plane for descending flight with a blade vortex interaction control force.

The present invention provides means for producing a force nearly parallel to the velocity vector to alter the inflow through the rotor disc in a manner calculated to prevent or diminish interaction between the blade vortices and following blade tips. The force "F", illustrated in FIG. 11 for a typical helicopter in descending flight, is a negative blade vortex interaction control force which can be generated by any means capable of producing an effective drag force. This drag force causes the helicopter tip-path plane to become more negative to balance forces along an axis aligned with the vehicle's freestream velocity vector. With the force controller, of whatever form, deployed, equation (3) becomes:

$$\alpha_{TPP} \approx \frac{-D_{eff}}{W} - \gamma - \frac{F}{W} \qquad (7)$$

Because the force controller only influences the vehicle's tip-path plane angle, the inflow equation (6) becomes:

$$\lambda = -\mu\frac{D}{W} - K\frac{C_T}{2}\frac{1}{\mu} - \mu\gamma - \mu\frac{F}{W} \qquad (8)$$

In effect, another term, $$\mu\frac{F}{W},$$

has been subtracted to the governing inflow equation (6).

Figure 12:
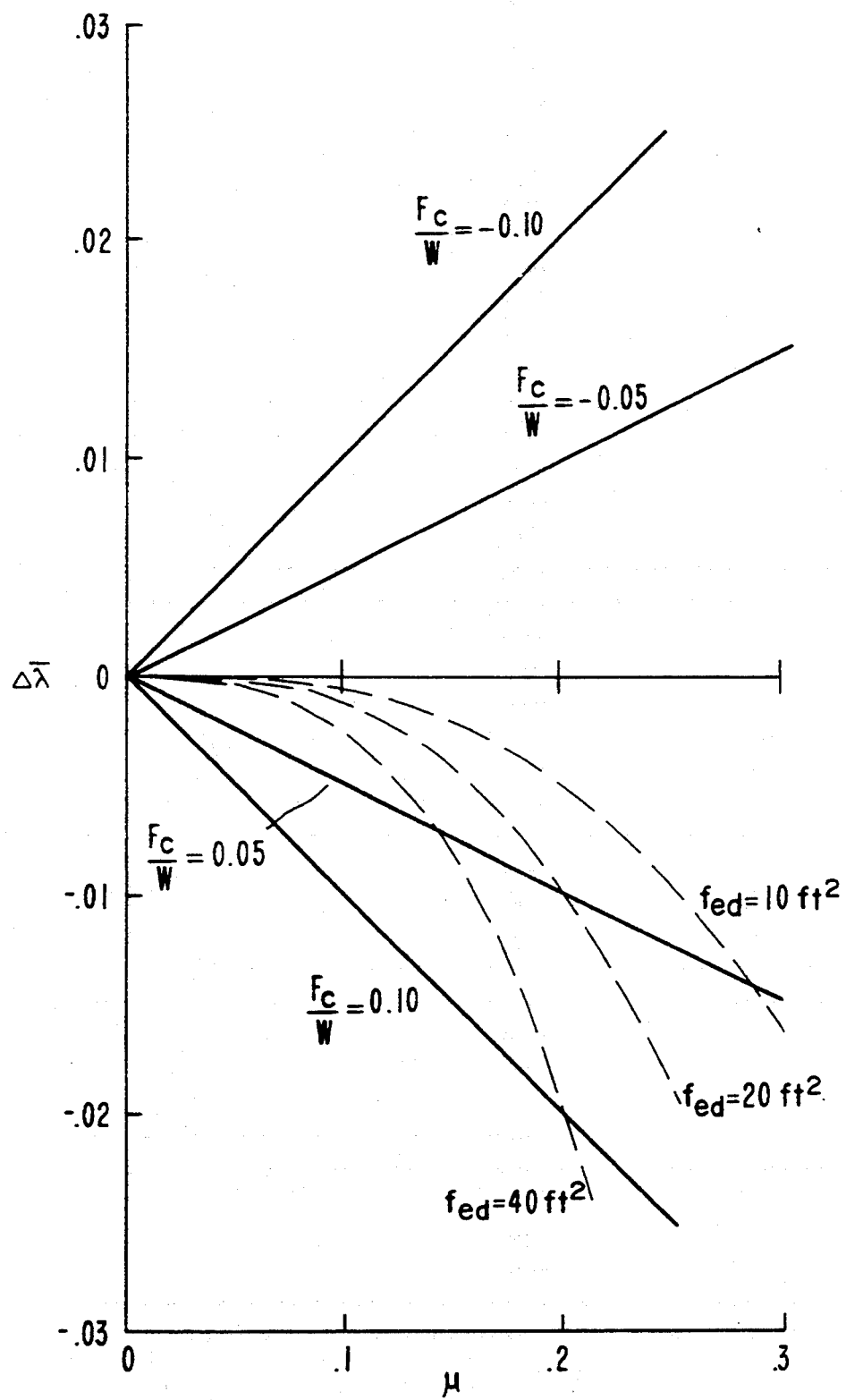
FIG. 12 is a graph showing change in inflow versus advance ratio for two types of force controllers.

The present invention contemplates a variety of devices for generating the required drag or thrust force F. Several preferred embodiments will be described in detail below. The first type is a simple thrusting device, such as a side-mounted rotor, propeller, ducted fan, or jet with mechanisms to generate defined levels of aerodynamic force. Because this force is assumed to be constant with forward airspeed, the change in the tip-path plane angle with airspeed is also constant. The subscript "c" has been added to "F" to represent this force that is constant, or independent of airspeed. This constant force controller generates a constant level of force at any airspeed. The change in inflow to the main rotor is directly proportional to the product of forward velocity and $F_c$. This relationship is illustrated in FIG. 12.

A second type of device for generating a control force, F, to alter the inflow uses pure aerodynamics. Simple drag devices are deployed in the freestream velocity field. The drag from these flow deceleration devices can be represented by the following equation:

$$F_{ed} = \tfrac{1}{2}\rho V^2 f_{ed} \qquad (9)$$

where $f_{ed}$=equivalent flat plate drag area of the deceleration devices.

These pure aerodynamic force controllers also change the effective tip-path plane angle but can only create a drag force, thus forcing the rotor into more negative tip-path plane angles which tend to further decrease, or make more negative, the inflow through the rotor disc. The change in inflow from this type of device is also illustrated in FIG. 12.

Figure 13:
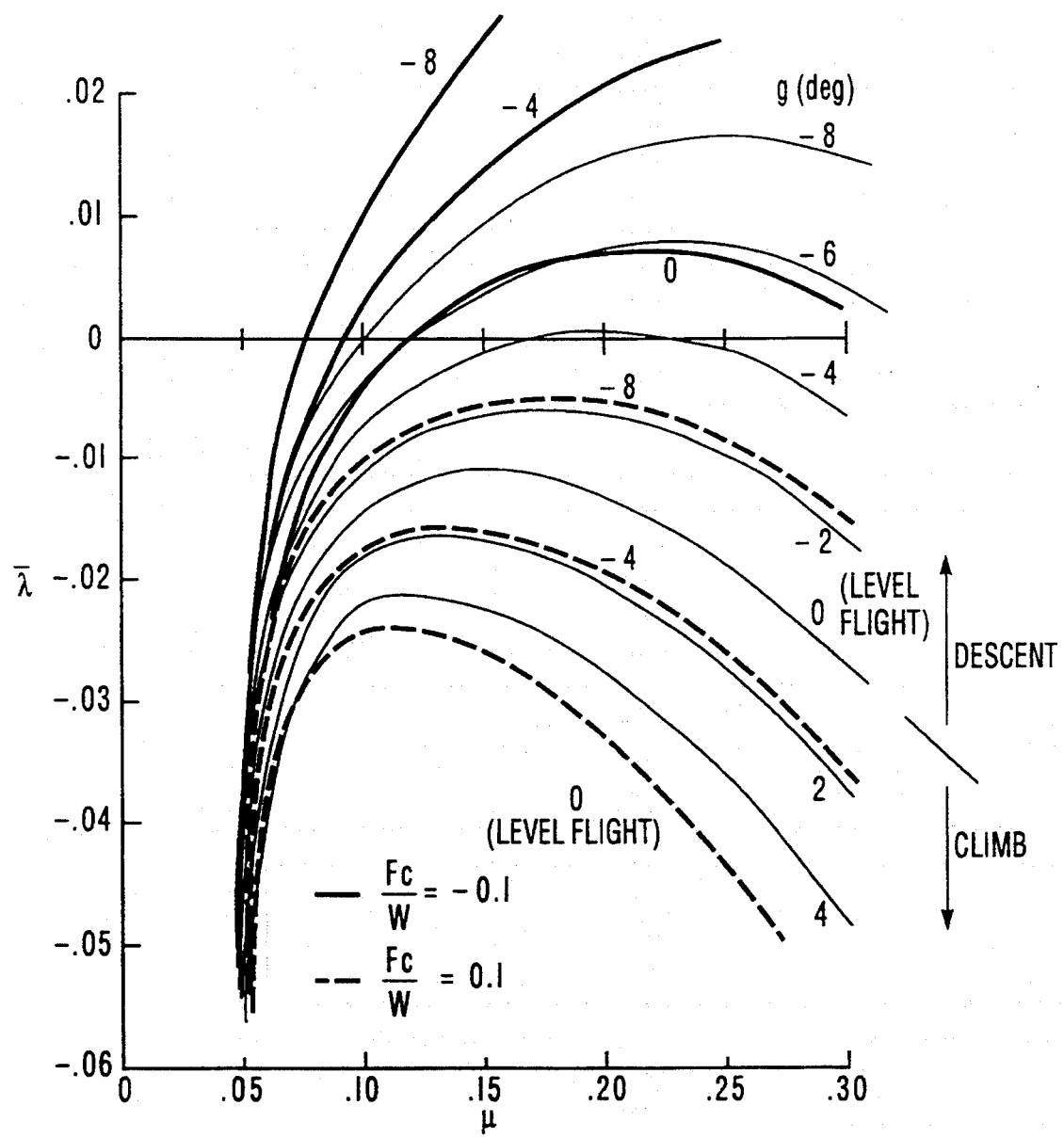
FIG. 13 is a graph showing inflow versus advance ratio for $F_c/W=0.1, -0.1$ at several values of $\gamma$.

The effectiveness of the force controller that is independent of airspeed, $F_c$, in controlling the inflow to the rotor system is clearly shown in FIG. 13. Negative values of force along the flight path cause the rotor inflow to become more positive. For level steady state flight above $\mu=0.12$, the inflow through the rotor is in the same direction as the thrust vector. In effect, the rotorcraft is flying like an autogyro, with the rotor tip path plane angle tilted positively. At normal approach conditions, where $\gamma$ becomes more negative, the inflow becomes even more positive, thus lessening the likelihood of encountering BVI conditions.

FIG. 13 also shows how the force controller that is independent of airspeed, $F_c$, can be used as a drag device and again increase the absolute value of the rotor's inflow. In level steady state flight with $$F_c/W = +0.1g$$

the extra drag decreases, or makes more negative, the inflow. In this case, the inflow is in the direction opposite to the thrust vector. Descending flight tends to reduce the magnitude of the negative inflow and eventually cause near zero inflow at steep enough descent angles. In both of these cases, the constant force controller, $F_c$, is effective at avoiding near zero inflow conditions.

Figure 14:
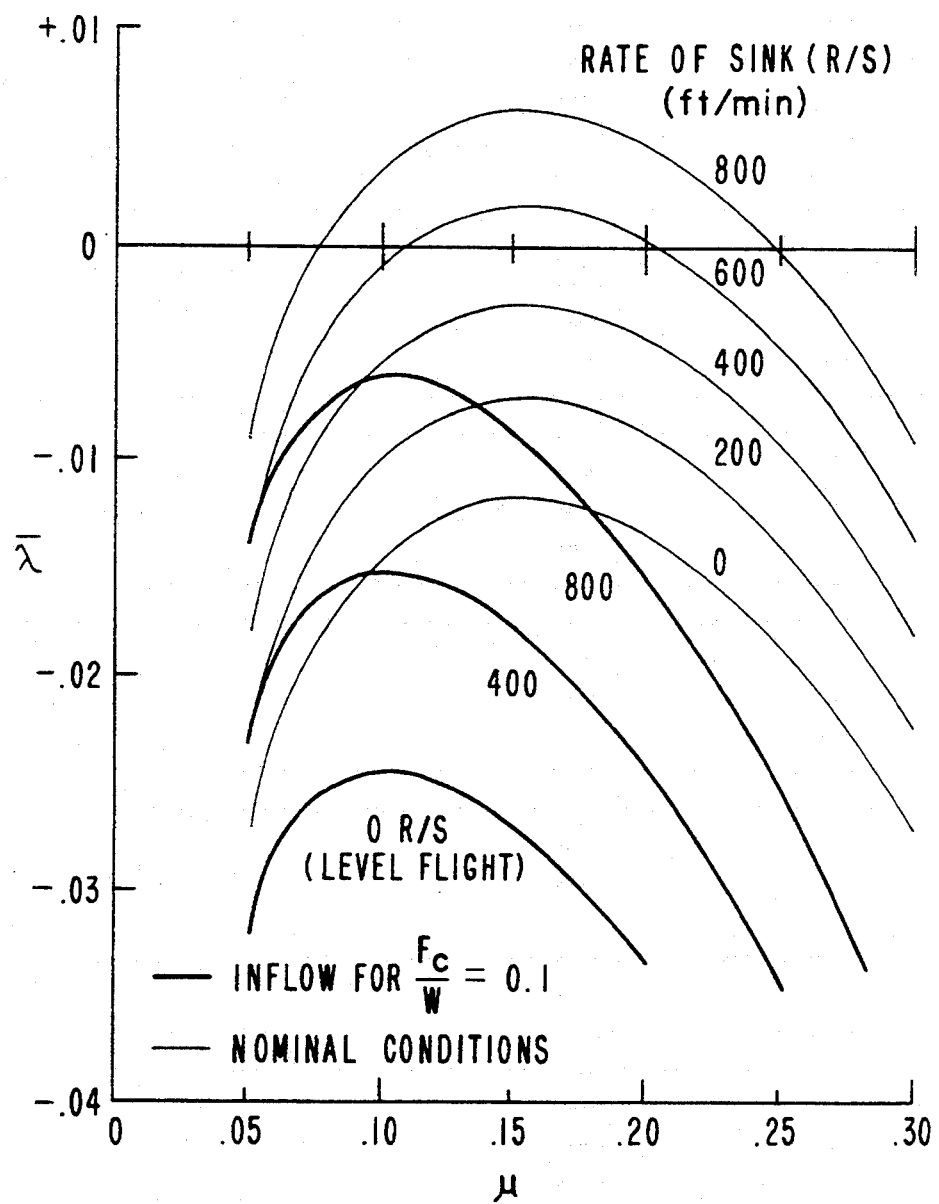
FIG. 14 is a graph showing inflow versus advance ratio for $F_c/W=-0.1$ at several values of R/S.

Pilots normally fly an approach to a landing by monitoring two key flight instruments: indicated airspeed and rate of sink (R/S). The effectiveness of the constant force controller is shown in FIG. 14 in this terminology. As illustrated, large changes in inflow are possible. $F_c$ can be used to alter the inflow through the rotor and thus minimize noise due to bladewake interaction.

Figure 15:
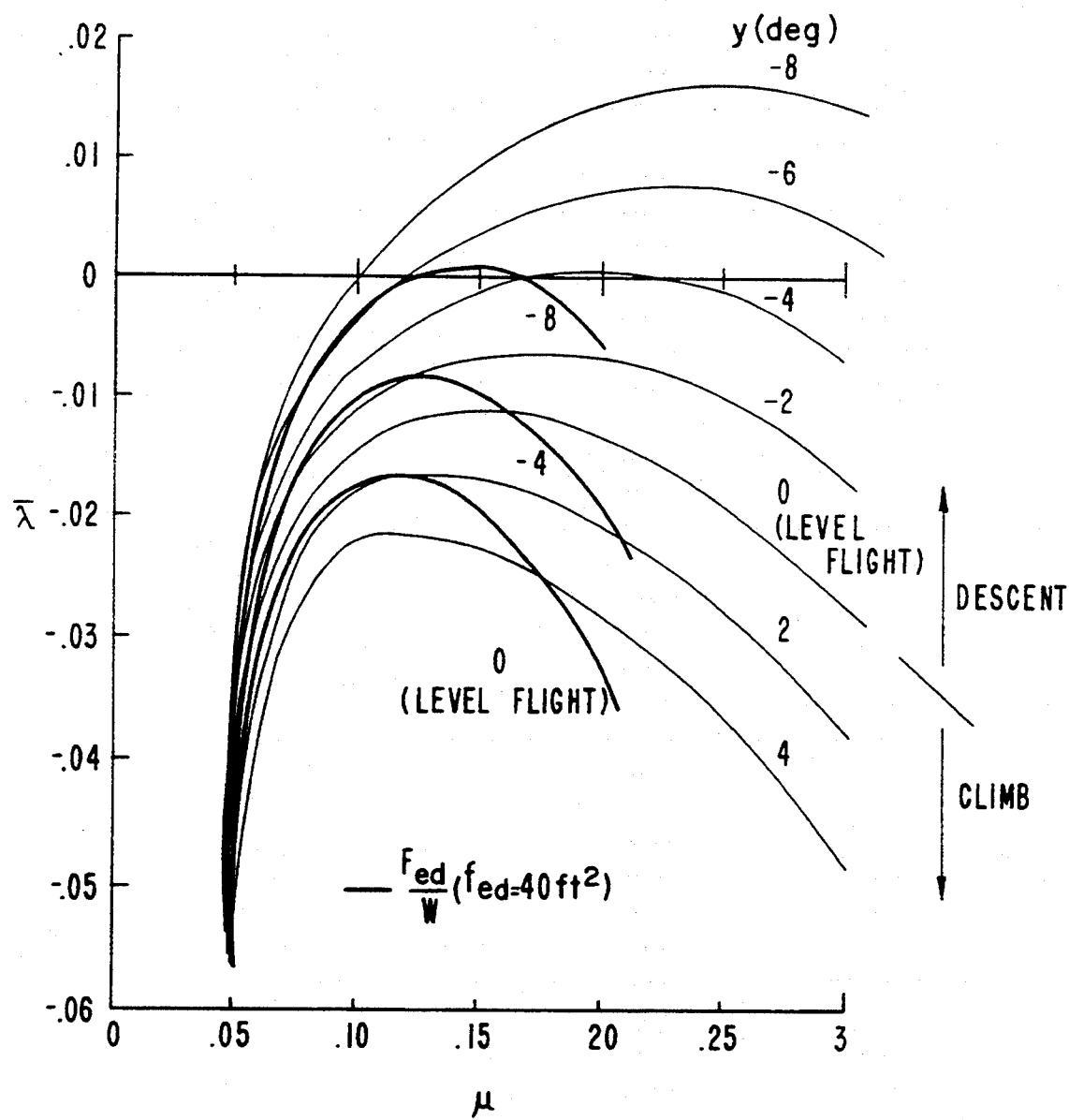
FIG. 15 is a graph showing inflow versus advance ratio for $F_{ed}/W$ ($f_{ed}=40$ ft$^2$) at several values of $\gamma$.
Figure 16:
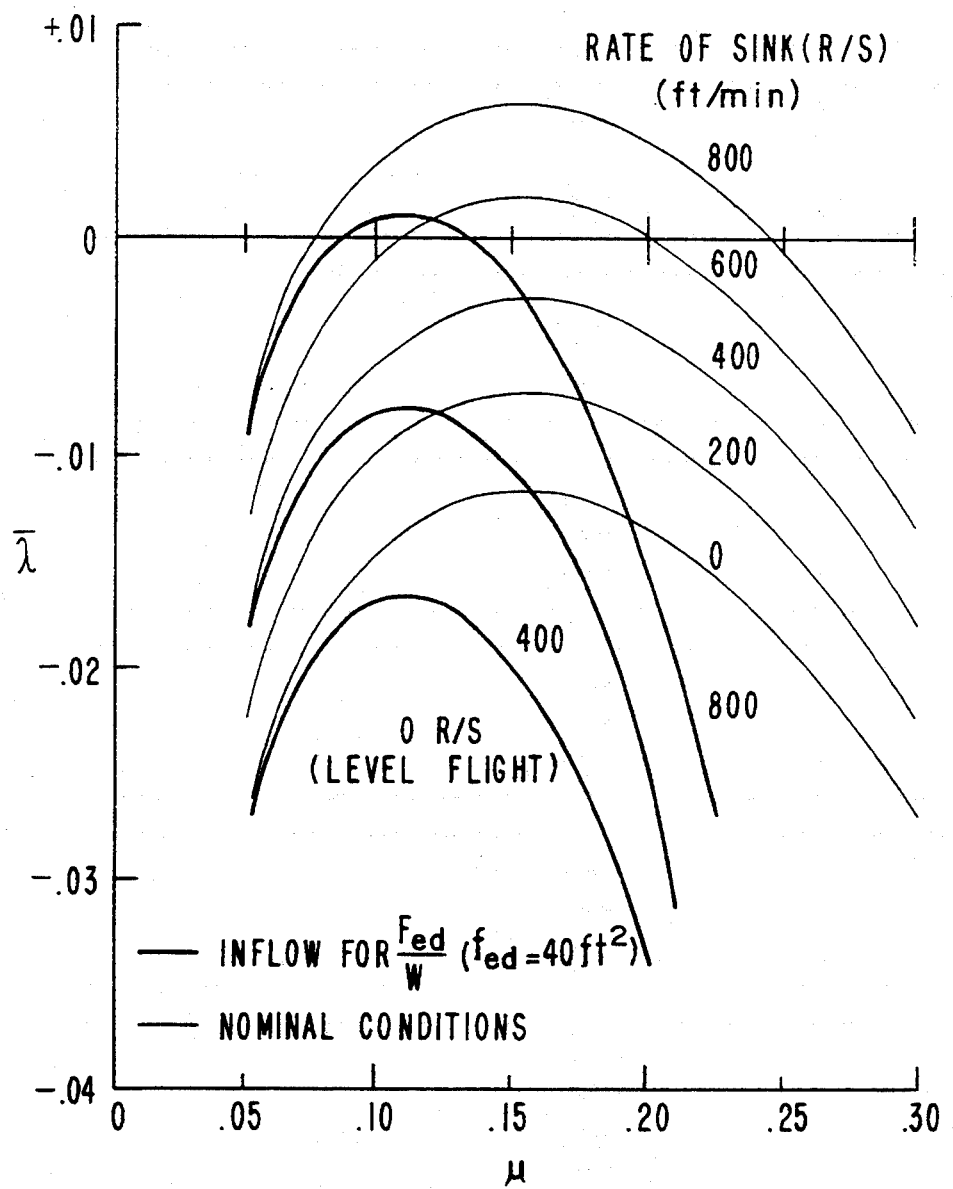
FIG. 16 is a graph showing inflow versus advance ratio for $F_{ed}/W$ ($f_{ed}=40$ ft$^2$) at several values of R/S.

The pure aerodynamic version of the present invention is also effective at controlling the inflow through the rotor disc, as illustrated in FIGS. 15 and 16. Large changes in inflow are possible at advance ratios above 0.15; for example, at a $\mu = 0.16$ and and a R/S of 500 ft/min, near zero inflow conditions exist without the $F_{ed}$ generating device being deployed. However, with the device deployed, a dramatic increase in negative inflow occurs, thus lessening the conditions where blade wake interaction is known to occur. As a result of using the device of the present invention, dramatic reductions in BVI noise are achieved.

Figure 17:
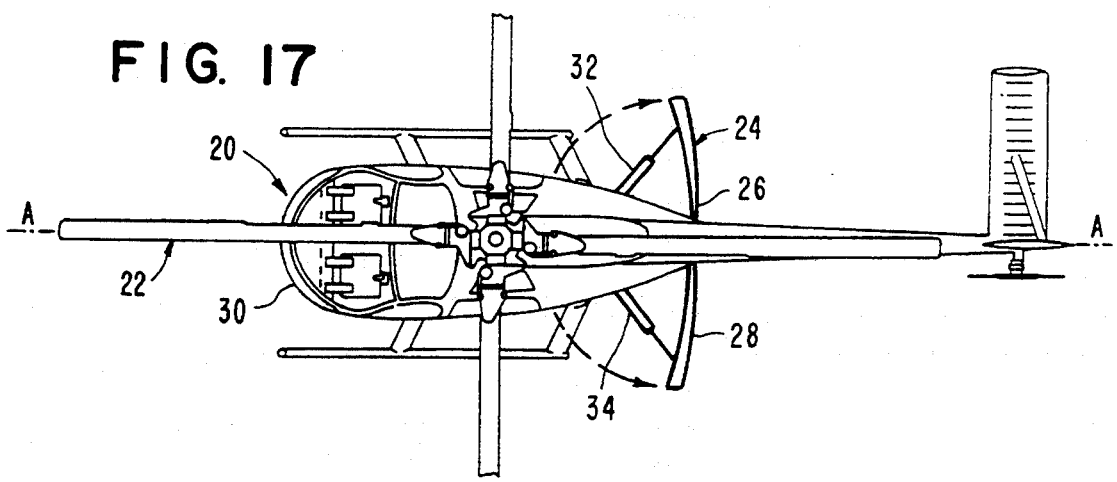
FIGS. 17, 18, and 19 are top, front and side elevational views, respectively, of a first preferred embodiment of a rotorcraft blade-vortex interaction controller according to the present invention.
Figure 18:
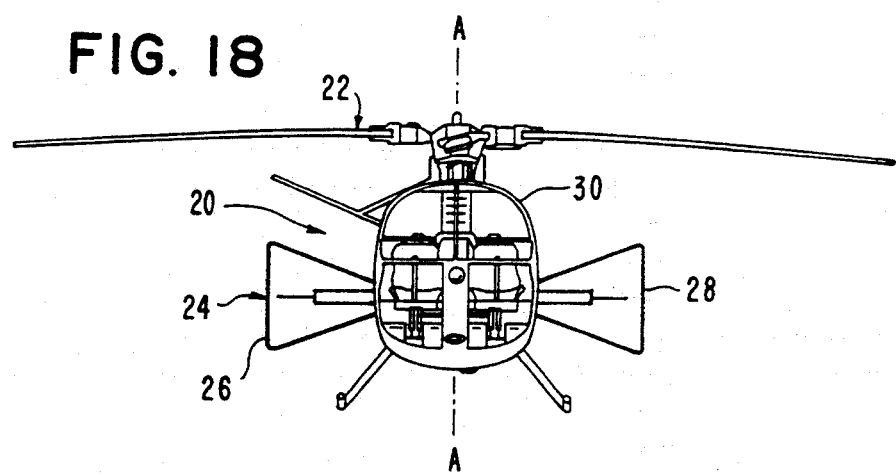
Figure 19:
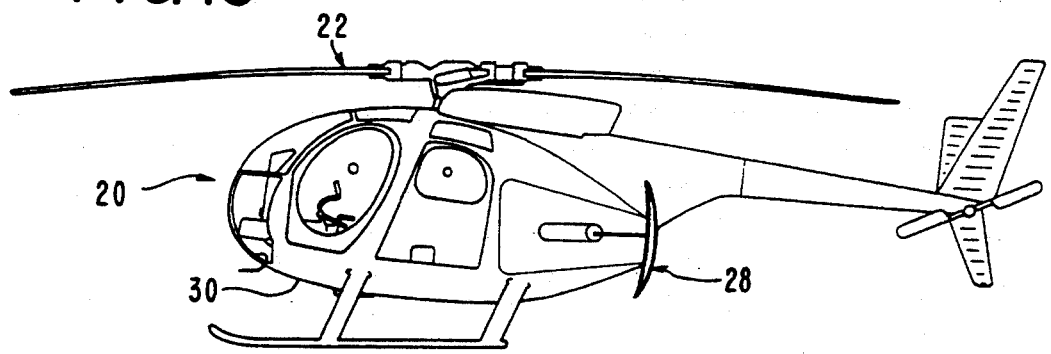

Referring to FIGS. 17-19, a helicopter 20 having a rotor system 22 is provided with a deployable control device 24 which, in the illustrated embodiment, includes two drag panels 26 and 28. Each panel is pivotally connected to the fuselage 30 and deployed by actuating extendable arms 32 and 34, respectively. The arms 32 and 34 may be fluid driven, such as pneumatic or hydraulic, or may be electrically driven. Each arm has a first end connected to the fuselage 30 and a second end connected to the corresponding drag panel 26 or 28, and can be actuated manually by the pilot to move from an inoperative position (such that the panels conform to the shape of the fuselage to maintain good in-flight aerodynamics, when not acting in the noise abatement mode) to an operative position in which the panels extend radially outwardly, with drag surfaces oriented vertically and perpendicular to the plane of symmetry A—A. The drag panels 26 and 28 are deployed when flight conditions are favorable for producing BVI noise to create a drag force which alters the average inflow to the rotor system 22. The effect is to create an increased negative inflow through the rotor disc under conditions when the inflow is normally small or near zero. The increased negative inflow causes a large separation between the rotor shed vortex structure and the following blades, thus reducing the blade-vortex and blade wake interaction noise. The blade vortex interaction control force $F_{ed}$, is parallel to the freestream velocity and decreases (makes more negative) the tip-path plane of the rotor system 22 in order to decrease BVI noise.

The collective area of the drag surfaces of the drag panels 26 and 28 is preferably sufficient to create a drag force equal to the fuselage drag. The panels 26 and 28 are also positioned so that the drag force vector passes through the center of gravity of the rotorcraft 20. The panels may have duel function so as to provide doors, for example, into the fuselage 30. In any embodiment, the panels 26 and 28 are normally in the inoperative position and are only deployed to effect noise abatement.

Figure 20:
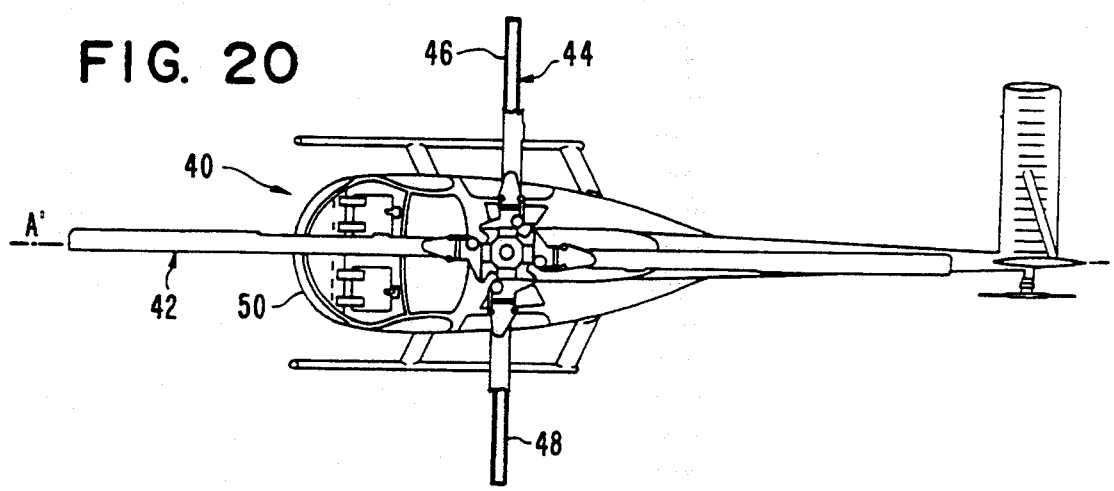
FIGS. 20, 21, and 22 are top, front and side elevational views, respectively, of a second preferred embodiment of a rotorcraft blade-vortex interaction controller according to the present invention.
Figure 21:
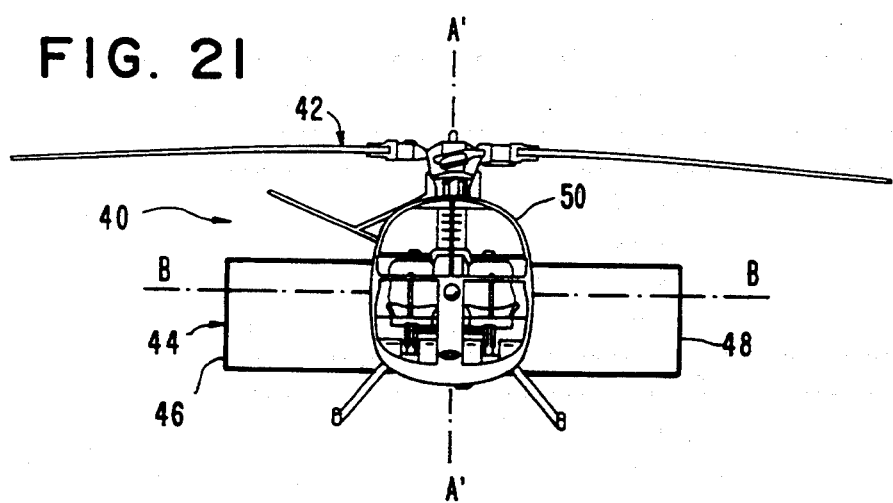
Figure 22:
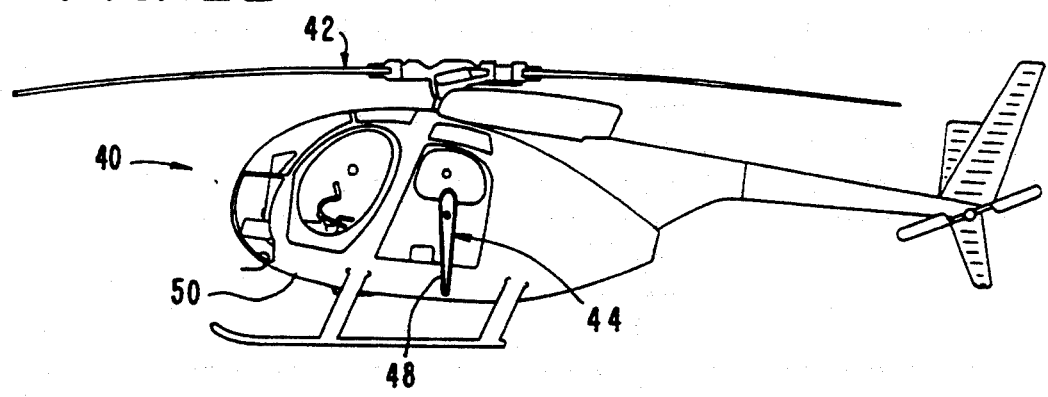

Referring to FIGS. 20-22, a helicopter 40 having a rotor system 42 is provided with a deployable control device 44 which includes two deployable airfoils 46 and 48. The airfoils 46 and 48 are pivotally mounted on opposite sides of the fuselage to pivot about axis B—B, and extend radially outwardly perpendicular to the plane of symmetry A'—A'. Any suitable controls and linkages can be provided to permit the pilot to actuate the airfoils 46 and 48 to move between inoperative (horizontal) and operative (vertical) positions.

In normal flight, the airfoils are pivoted to a horizontal orientation, so as to function not as a noise abatement device, but as a lift-generating device. When it becomes necessary to generate a drag force, the airfoils 46 and 48 are pivoted to a vertical orientation as seen in FIGS. 20-22. The effect is the same as in the previous embodiment in that a drag force is generated to make more negative or more positive the rotor inflow to avoid blade-vortex interaction.

As in the previous embodiment, the airfoils 46 and 48 are positioned to create the drag force through the center of gravity of the helicopter 40, and parallel to the freestream velocity.

Figure 23:
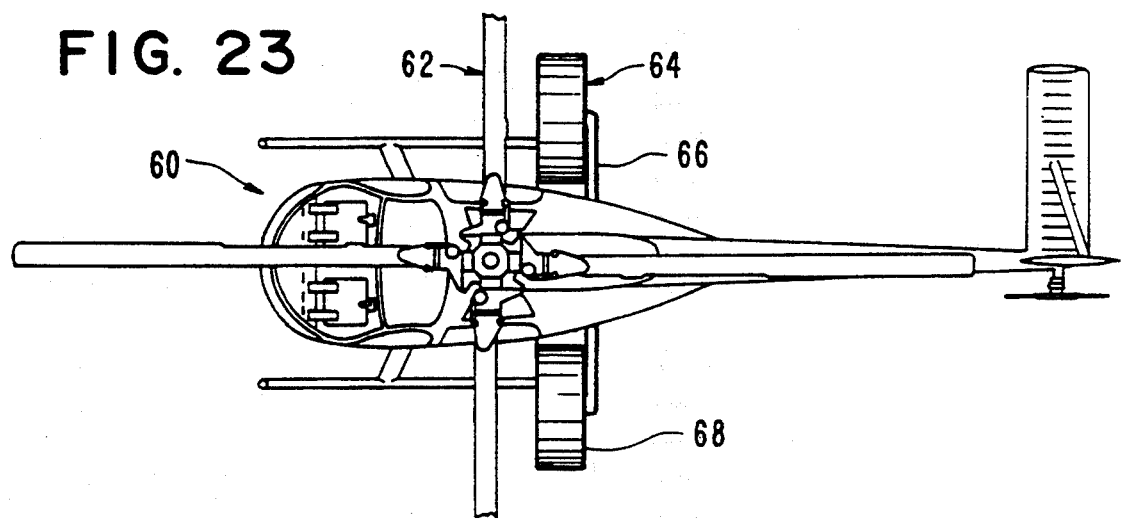
FIGS. 23, 24, and 25 are top, front and side elevational views, respectively, of a third preferred embodiment of a rotorcraft blade-vortex interaction controller according to the present invention.
Figure 24:
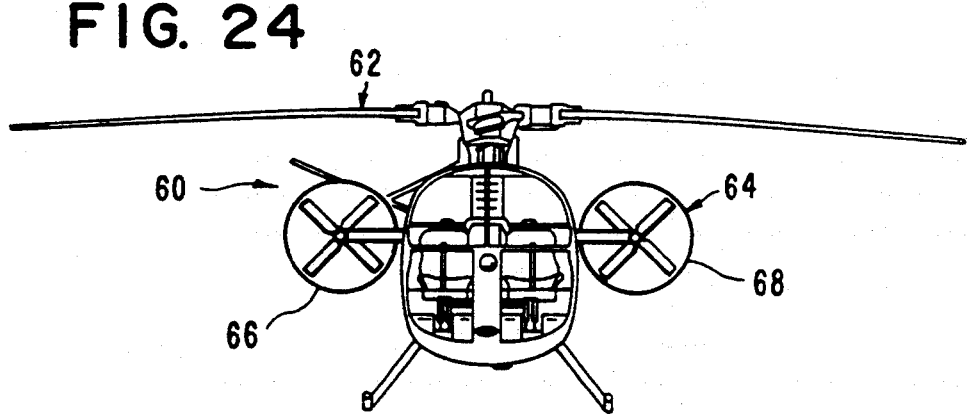
Figure 25:
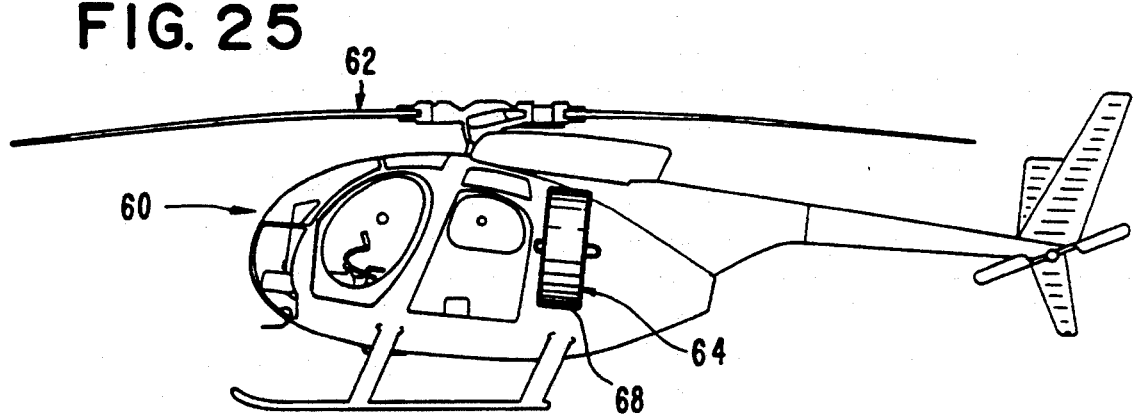

Referring to FIGS. 23-25, a helicopter 60 having a rotor system 62 includes a control device 64 which creates a force, $F_c$, that can be positive (drag force) or negative (thrust force). The positive drag force changes the inflow in such a way as to achieve the same result as in the previous embodiments. The negative force (thrust) increases (makes more positive) the tip-path plane of the rotor and under selected conditions also maximizes the separation between the rotor shed vortex structure and the following blades, thus reducing the blade-vortex interaction and blade wake interaction noise. The control device 64 includes two ducted fans 66 and 68 which can be run off of the main gear box as is the tail rotor. The fans 66 and 68 produce a drag or a thrust force via the thrust created by the exhaust of the fans. Other types of thrust-producing devices can be used, such as propellers or jets operated to produce a desired level of aerodynamic force. It should be noted that when such devices are creating a net drag force, they are often extracting energy from the airstream. In these cases the net energy gained from these devices can be used to lessen the severity of emergency situations arising from main engines(s) power failure. That is, during a power failure, the fans will help the main rotor autorotate.

Figure 26:
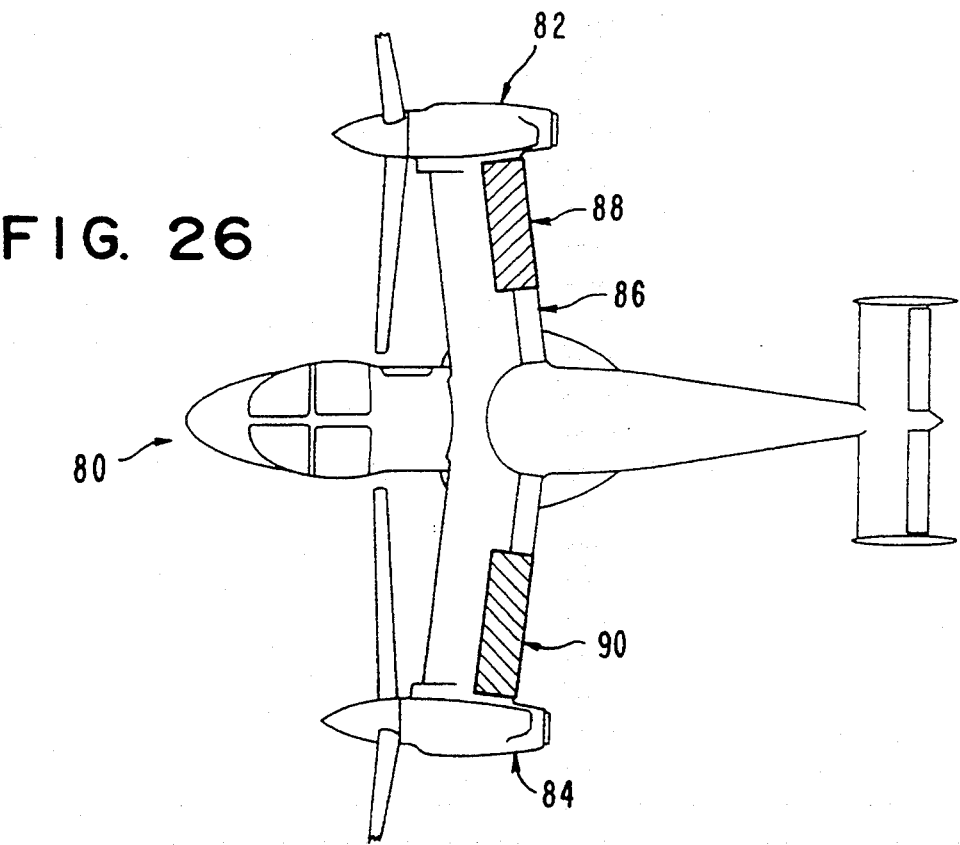
FIGS. 26, 27, and 28 are top, front and side elevational views of a fourth, preferred embodiment of a rotorcraft blade-vortex interaction controller according to the present invention.
Figure 28:
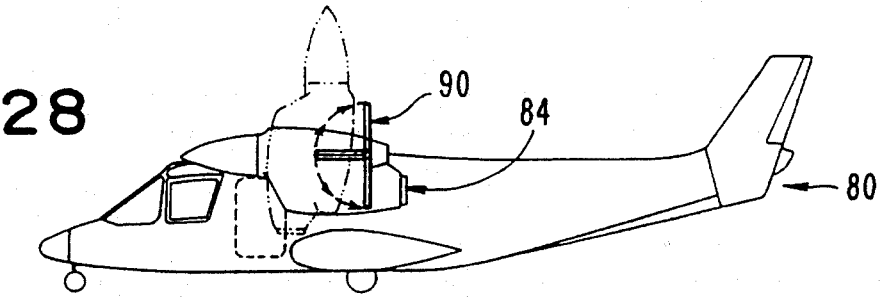
Figure 27:
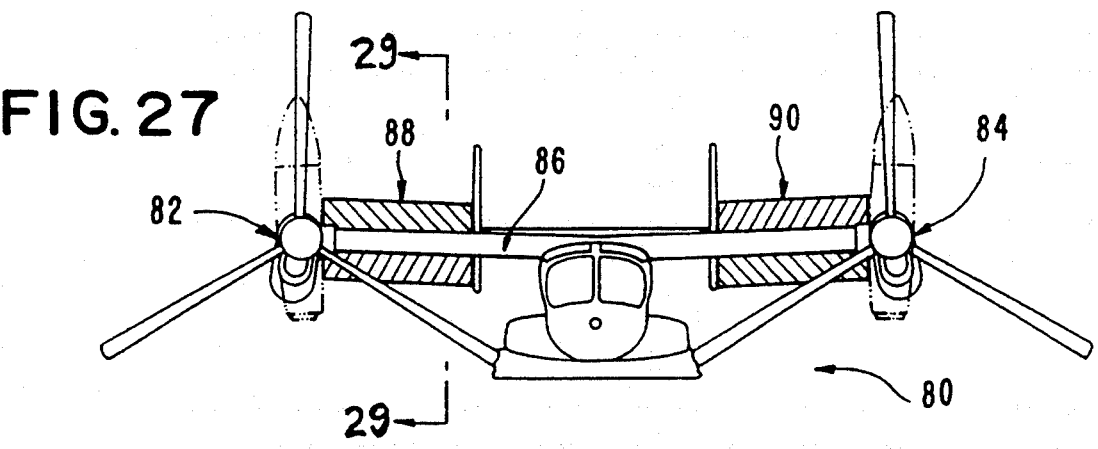

For rotorcraft having either tilt wings or tilt rotors, the requisite drag force can be generated by using modified flaps, as shown in the embodiment of FIGS. 26-28. The aircraft 80 has two tilt rotors 82 and 84 mounted on opposite ends of the wing 86. The wing 86 includes at the trailing edge a pair of deployable drag panels 88 and 90, each having an upper half pivotally connected to a lower half. In the inoperative position, as shown in FIG. 26, the panels aerodynamically conform to the shape of the wing 86. However, as shown in FIGS. 27 and 28, when it becomes necessary to create a drag force, the two halves pivot relative to each other by means of a suitable hinge and actuator structure (not shown) to create a vertically oriented drag panel. With the tilt rotors 82 and 84 positioned vertically, the drag panels 88 and 90 can be deployed to provide a drag force, $F_{ed}$, of sufficient magnitude to increase the absolute value of the rotor inflow.

Figure 29:
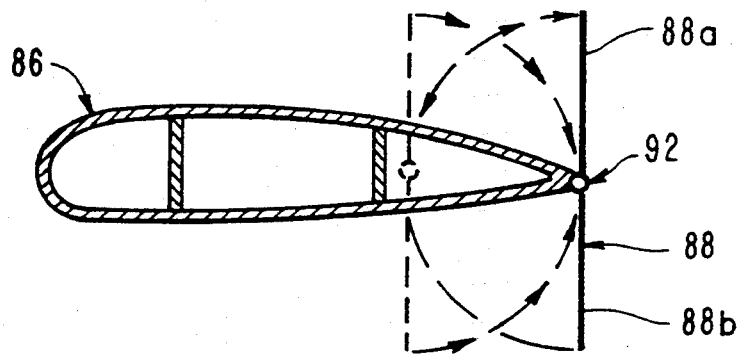
FIG. 29 is a sectional view taken along line C—C of FIG. 27.

For the embodiment illustrated in FIGS. 26-28, the drag panels can be incorporated into the flap system of the aircraft. As shown in FIG. 29, the panel 88 includes an upper half 88a and a lower half 88b, each being pivotal about a pivot hinge 92 to become substantially aligned with each other in the operative position. Appropriate actuators can be provided for imparting pivotal movement in the halves 88a and 88b. Also shown in FIG. 30 also illustrates in broken lines a variation in which the halves pivot about a hinge having a pivot axis spaced inwardly of the trailing edge of the wing 86. Either variation can be referred to as an "umbrella flap", and both have the advantages of simplicity, relatively large effective drag surface, good download reduction potential, and minimum pitching moment change.

Figure 30:
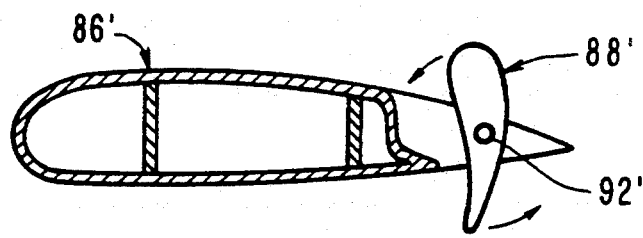
FIG. 30 and 31 are views similar to FIG. 29 showing variations of drag panels.

FIG. 30 illustrates an alternative embodiment in which the drag panel 88' is the trailing edge portion of the wing 86'. The drag panel 88' is pivotally mounted on a hinge 92' spaced inwardly of the trailing edge of the wing 86'. When a drag force is required, the panel 88' is pivoted to be in the operative position (vertically oriented), whereby portions of the panel extend above and below the wing. This embodiment has many of the same advantages of the umbrella type panel described above, except that the drag surface area is not as great.

Figure 31:
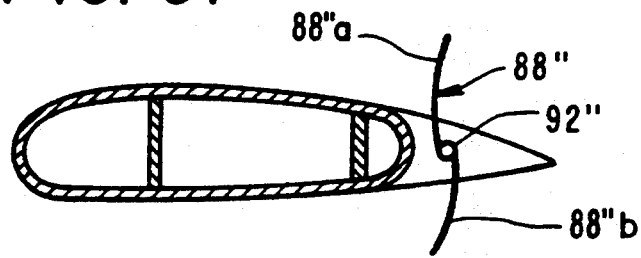

FIG. 31 illustrates still another embodiment for a drag panel 88" also pivotally mounted on the trailing edge of the wing 86". In this embodiment, the panel 88" includes two halves 88"a and 88"b pivot in opposite directions about a hinge 92". The hinge 92" is spaced inwardly of the trailing edge of the wing 86". This embodiment has the advantages of relative simplicity of construction, relatively large effective drag, minimum pitching moment, good download reduction, and smooth transition from lifting to non-lifting configurations. With respect to the latter, when the two halves 88"a and 88"b are not in the drag-producing mode, they form a single trailing edge flap structure and can be controlled and operated as such. In the flap mode, the panel pivots about a pivot axis of the hinge 92".

When the drag force changes the rotor inflow to provide noise abatement, the rotorcraft tends to adopt a more pronounced pitch which can be compensated for by tilting the rotor shaft so that the entire rotor system tilts relative to the fuselage. The tilt of the rotor can be accomplished by providing any suitable structuring which facilitates tilting movement, such as a universal joint in the rotor shaft. Generally, a change in power will be required when the rotor system is tilted. Various means may be employed to effect shaft tilting. No more than about 4 degrees of tilt would be required.

While advantageous embodiments have been chosen to illustrate the invention, it will be understood by those skilled in the art that various changes and modifications can be made therein without departing from the scope of the invention as defined in the appended claims.

I claim:

1. An apparatus for decreasing blade-vortex interaction noise of a rotorcraft having a fuselage and a rotor system, comprising:
   control means for increasing the absolute value of inflow to the rotor system; and
   means for actuating the control means under flight condition when infow is near zero,
   wherein the control means comprises first and second drag panels mounted respectively on opposite sides of the fuselage and being movable between operative and inoperative positions by the actuating means and being vertically oriented and extending radially outwardly when in the operative position.

2. The apparatus according to claim 1, wherein the actuator means comprises first and second extendable arms respectively coupled to the first and second panels, each having one end connected to the fuselage and an opposite end connected to a corresponding one of the first and second panels.

3. The apparatus according to claim 1, wherein the first and second drag panels have a combined drag surface area sufficient to produce a drag force at least equal to a drag force of the fuselage.

4. A method of decreasing blade-vortex interaction noise of rotorcraft having a fuselage and a rotor comprising:
   creating a drag force to cause a more negative angle for the tip-path plane of the rotor system,
   wherein creating said drag force comprises deploying a vertically aligned drag structure having a drag surface sufficient to create the drag force.

5. A method of decreasing blade-vortex interaction noise of rotorcraft having a fuselage and a rotor comprising:
   creating a negative drag force (a net thrust) to cause a more negative angle for the tip-path plane of the rotor system,
   wherein creating said drag force comprises deploying a vertically aligned a drag structure having a drag surface sufficient to create the drag force.

6. An apparatus for decreasing blade-vortex interaction noise of a rotorcraft havign a fuselage and a rotor system, comprising:
   control means for increasing the absolute value of inflow to the rotor system; and
   means for actuating the control means under flight conditions when inflow is near zero,
   wherein the control means comprises first and second drag panels mounted respectively on opposite sides of the fuselage and being movable between operative and inoperative positions by the actuating means, and
   wherein the first and second drag panels have a combined drag surface area sufficient to produce a drag force at least equal to a drag force of the fuselage.

* * * * *